US012366821B2

(12) United States Patent
Itabashi et al.

(10) Patent No.: US 12,366,821 B2
(45) Date of Patent: *Jul. 22, 2025

(54) DRUM CARTRIDGE INCLUDING ELECTRICAL CONTACT SURFACE MOVABLE RELATIVE TO DRUM FRAME

(71) Applicant: BROTHER KOGYO KABUSHIKI KAISHA, Nagoya (JP)

(72) Inventors: Nao Itabashi, Nagoya (JP); Naoya Kamimura, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,427

(22) Filed: May 23, 2024

(65) Prior Publication Data

US 2024/0319664 A1 Sep. 26, 2024

Related U.S. Application Data

(63) Continuation of application No. 18/366,360, filed on Aug. 7, 2023, now Pat. No. 12,025,948, which is a (Continued)

(30) Foreign Application Priority Data

Aug. 30, 2019 (JP) ................................ 2019-158770

(51) Int. Cl.
*G03G 21/18* (2006.01)
*G03G 15/00* (2006.01)

(52) U.S. Cl.
CPC ....... *G03G 21/1867* (2013.01); *G03G 15/751* (2013.01); *G03G 15/80* (2013.01);

(Continued)

(58) Field of Classification Search
CPC .. G03G 15/751; G03G 15/80; G03G 21/1652; G03G 21/1867; G03G 21/1875; G03G 2221/166; G03G 2221/1823
See application file for complete search history.

(56) References Cited

U.S. PATENT DOCUMENTS 11,500,328 B2 11/2022 Itabashi et al.
12,025,948 B2 * 7/2024 Itabashi ............... G03G 15/751

(Continued)

FOREIGN PATENT DOCUMENTS

JP 6-67484 A 3/1994
JP 2001-255787 A 9/2001

(Continued)

OTHER PUBLICATIONS

Office Action issued in corresponding Japanese Patent Application No. 2019-158770, May 16, 2023.

(Continued)

*Primary Examiner* — Sophia S Chen
(74) *Attorney, Agent, or Firm* — Merchant & Gould P.C.

(57) ABSTRACT

A drum cartridge includes: a drum frame to which a developing cartridge is attachable; a photosensitive drum rotatable about an axis extending in a first direction; a memory having an electrical contact surface; and a resilient member positioned between the electrical contact surface and the drum frame. The resilient member is configured to expand and compress in a second direction crossing the electrical contact surface between a first state and a second state, the resilient member having a shorter length in the second state than in the first state. A distance between the drum frame and the electrical contact surface in the second direction when the resilient member is in the second state is smaller than a (Continued)

distance between the drum frame and the electrical contact surface in the second direction when the resilient member is in the first state.

20 Claims, 7 Drawing Sheets

Related U.S. Application Data continuation of application No. 18/048,076, filed on Oct. 20, 2022, now Pat. No. 11,762,331, which is a continuation of application No. 17/465,924, filed on Sep. 3, 2021, now Pat. No. 11,500,328, which is a continuation of application No. 17/002,268, filed on Aug. 25, 2020, now Pat. No. 11,112,756.

(52) U.S. Cl.
CPC ................ *G03G 2221/166* (2013.01); *G03G 2221/1823* (2013.01)

(56) References Cited

U.S. PATENT DOCUMENTS

| | | | |
|---|---|---|---|
| 2002/0031359 | A1 | 3/2002 | Karakama et al. |
| 2002/0159778 | A1 | 10/2002 | Kida |
| 2003/0123896 | A1 | 7/2003 | Goto et al. |
| 2003/0215257 | A1 | 11/2003 | Karakama et al. |
| 2006/0045545 | A1 | 3/2006 | Burchette et al. |
| 2006/0285132 | A1 | 12/2006 | Kwon |
| 2007/0264043 | A1 | 11/2007 | Miller |
| 2008/0159774 | A1 | 7/2008 | Tanabe et al. |
| 2009/0169229 | A1 | 7/2009 | Mutoh |
| 2014/0086597 | A1 | 3/2014 | Tanabe et al. |
| 2015/0153706 | A1 | 6/2015 | Tani et al. |
| 2017/0184998 | A1 | 6/2017 | Itabashi |
| 2017/0185001 | A1 | 6/2017 | Itabashi et al. |
| 2017/0185032 | A1 | 6/2017 | Itabashi et al. |
| 2018/0095420 | A1 | 4/2018 | Abe et al. |
| 2018/0314202 | A1 | 11/2018 | Yokoi |
| 2019/0041792 | A1 | 2/2019 | Kishi et al. |
| 2019/0196361 | A1 | 6/2019 | Kyotani |
| 2019/0196394 | A1 | 6/2019 | Yabuki et al. |
| 2019/0265641 | A1 | 8/2019 | Yokoi |
| 2019/0278221 | A1 | 9/2019 | Saeki |
| 2020/0096938 | A1 | 3/2020 | Endo |
| 2020/0209780 | A1 | 7/2020 | Hamada et al. |
| 2020/0241461 | A1 | 7/2020 | Zhang et al. |
| 2020/0310339 | A1 | 10/2020 | Yokoi et al. |
| 2020/0341427 | A1 | 10/2020 | Komatsu et al. |

FOREIGN PATENT DOCUMENTS

| | | | |
|---|---|---|---|
| JP | 2003-195726 | A | 7/2003 |
| JP | 2006-119467 | A | 5/2006 |
| JP | 2007-292802 | A | 11/2007 |
| JP | 2012-212188 | A | 11/2012 |
| JP | 2014-71130 | A | 4/2014 |
| JP | 2017-116826 | A | 6/2017 |
| JP | 2017-116827 | A | 6/2017 |
| JP | 2017-116828 | A | 6/2017 |
| JP | 2018-5156 | A | 1/2018 |
| JP | 2018-54998 | A | 4/2018 |
| JP | 2018-189740 | | 11/2018 |
| JP | 2019-117343 | A | 7/2019 |
| JP | 2019-144480 | A | 8/2019 |

OTHER PUBLICATIONS

Office Action issued in corresponding Japanese Patent Application No. 2019-158770, Oct. 3, 2023.

Office Action issued in corresponding Japanese Patent Application No. 2019-158770 on Apr. 23, 2024.

* cited by examiner

DRUM CARTRIDGE INCLUDING ELECTRICAL CONTACT SURFACE MOVABLE RELATIVE TO DRUM FRAME

CROSS REFERENCE TO RELATED APPLICATION

This application is a continuation of U.S. patent application Ser. No. 18/366,360, filed Aug. 7, 2023, now U.S. Patent 12.025. 948, which is a continuation of U.S. patent application Ser. No. 18/048,076, filed Oct. 20, 2022, now U.S. Pat. No. 11,762,331, which is a continuation of U.S. patent application Ser. No. 17/465,924, filed Sep. 3, 2021, now U.S. Pat. No. 11,500,328, which is a continuation of U.S. patent application Ser. No. 17/002,268, filed Aug. 25, 2020, now U.S. Pat. No. 11,112,756, which claims priority from Japanese Patent Application No. 2019-158770 filed Aug. 30, 2019. The entire content of the priority applications is incorporated herein by reference.

TECHNICAL FIELD

The present disclosure relates to a drum cartridge.

BACKGROUND

There has been known an electro-photographic type image-forming apparatus such as a laser printer and an LED printer. As an example, a prior art discloses an image-forming apparatus including a developing cartridge and a drum cartridge. The developing cartridge is attachable to the drum cartridge. The drum cartridge to which the developing cartridge is attached is attached to a body of the image-forming apparatus. The developing cartridge includes an IC chip. The IC chip stores therein various information on the developing cartridge.

SUMMARY

Recently, there has been a demand to provide an IC chip also on a drum cartridge. However, if an IC chip is to be mounted on a drum cartridge, an electrical contact surface of the IC chip is required to make contact with an electrical contact provided in a body of an image-forming apparatus. During contact of the electrical contact surface with the electrical contact, rubbing occurs on the electrical contact surface due to pressure generated between the electrical contact and the electrical contact surface.

In view of the foregoing, it is an object of the disclosure to provide a technology capable of restraining rubbing of an electrical contact surface in a drum cartridge including the electrical contact surface.

In order to attain the above and other objects, according to one aspect, the disclosure provides a drum cartridge including a drum frame, a photosensitive drum, a memory, and a resilient member. A developing cartridge is attachable to the drum frame. The photosensitive drum is rotatable about an axis extending in a first direction. The memory has an electrical contact surface. The resilient member is positioned between the electrical contact surface and the drum frame. The resilient member is configured to expand and compress in a second direction crossing the electrical contact surface between a first state and a second state. The resilient member has a shorter length in the second state than in the first state. A distance between the drum frame and the electrical contact surface in the second direction when the resilient member is in the second state is smaller than a distance between the drum frame and the electrical contact surface in the second direction when the resilient member is in the first state.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Hereinafter, one embodiment of the present disclosure will be described with reference to the accompanying drawings.

Hereinafter, a direction in which a rotational axis of a photosensitive drum extends will be referred to as a “first direction”. Further, a direction crossing the first direction will be referred to as a “second direction”. Further, a direction in which one end portion at which the photosensitive drum is positioned and another end portion are arranged will be referred to as a “third direction”. The first direction and the second direction cross (preferably, orthogonal to) each other. The second direction and the third direction cross each other. The third direction and the first direction cross (preferably, orthogonal to) each other.

1. Outline of Image-Forming Apparatus

Figure 1:
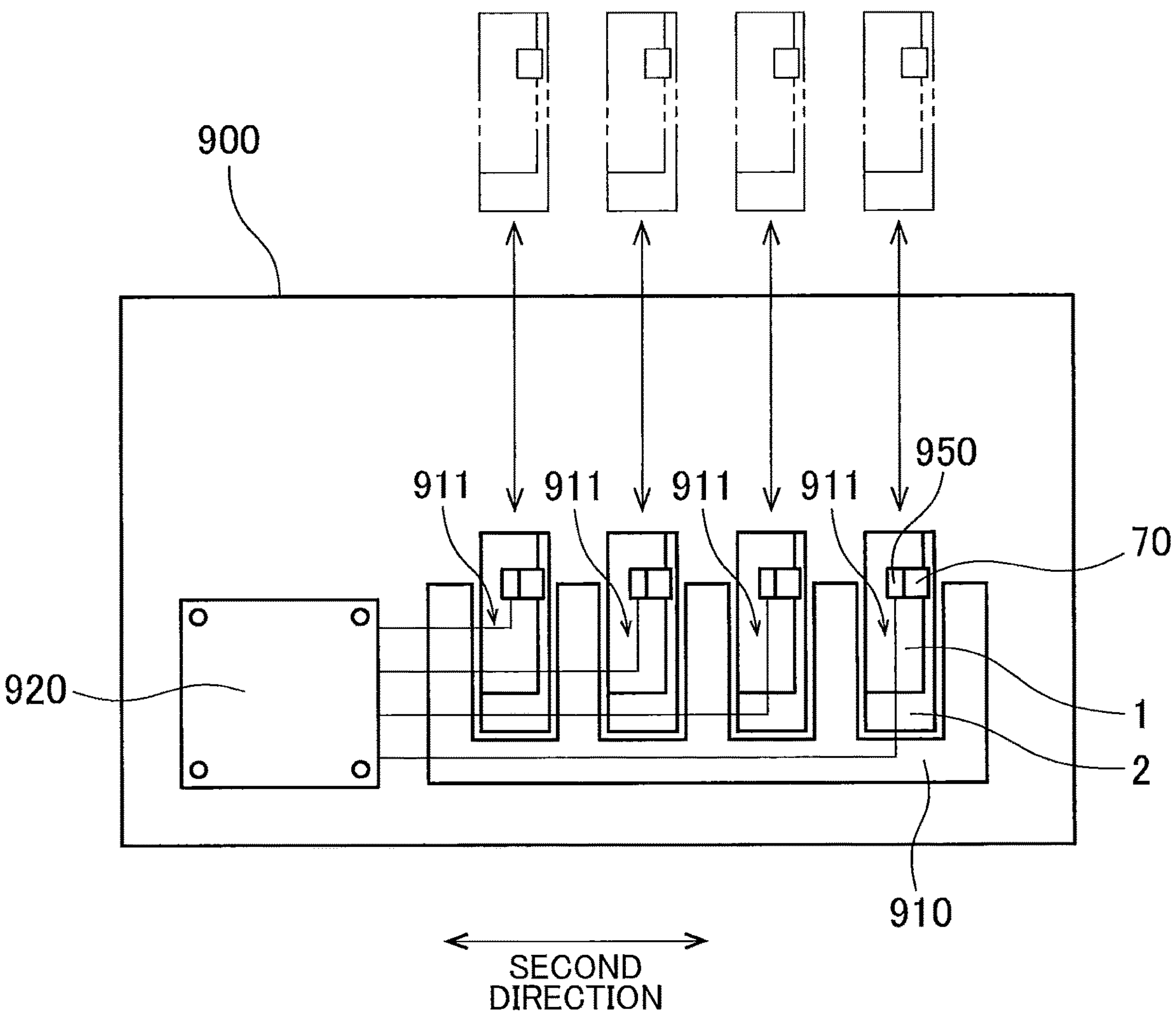
FIG. 1 is a schematic view of an image-forming apparatus.

FIG. 1 is a schematic view of an image-forming apparatus 900 according to the embodiment. The image-forming apparatus 900 is an electro-photographic type printer such as a laser printer and an LED printer. As illustrated in FIG. 1, the image-forming apparatus 900 includes a main-body frame 910, a controller 920, four developing cartridges 1, and four drum cartridges 2.

The main-body frame 910 has four slots 911. The four slots 911 are arrayed in the second direction at intervals. A single developing cartridge 1 is configured to be attached to a single drum cartridge 2. Each drum cartridge 2 to which one corresponding developing cartridge 1 is attached is configured to be attached to one of the four slots 911. Hence, four sets of the drum cartridge 2 and the developing cartridge 1 are attachable to the main-body frame 910.

The four developing cartridges 1 respectively accommodate therein developer of different colors (for example, cyan, magenta, yellow, and black). In the image-forming apparatus 900, an image is formed on a recording surface of a printing sheet with the developer (toner) supplied from the respective developing cartridges 1. Incidentally, the number of the drum cartridges 2 to be attached to the main-body frame 910 is not restrictive, and may be one to three or not less than five.

The controller 920 is constituted by, for example, a circuit board. The controller 920 includes a processor such as a CPU, and various memories. The controller 920 is configured to execute various processing to be performed in the image-forming apparatus 900 by operations of the processor in accordance with programs.

Each of the four drum cartridges 2 includes a memory 70. The memory 70 is a storage medium from which information is readable and to which information is writable. The memory 70 is electrically connected to the controller 920 upon attachment of the drum cartridge 2 to the corresponding slot 911 of the main-body frame 910.

2. Developing Cartridge

Figure 2:
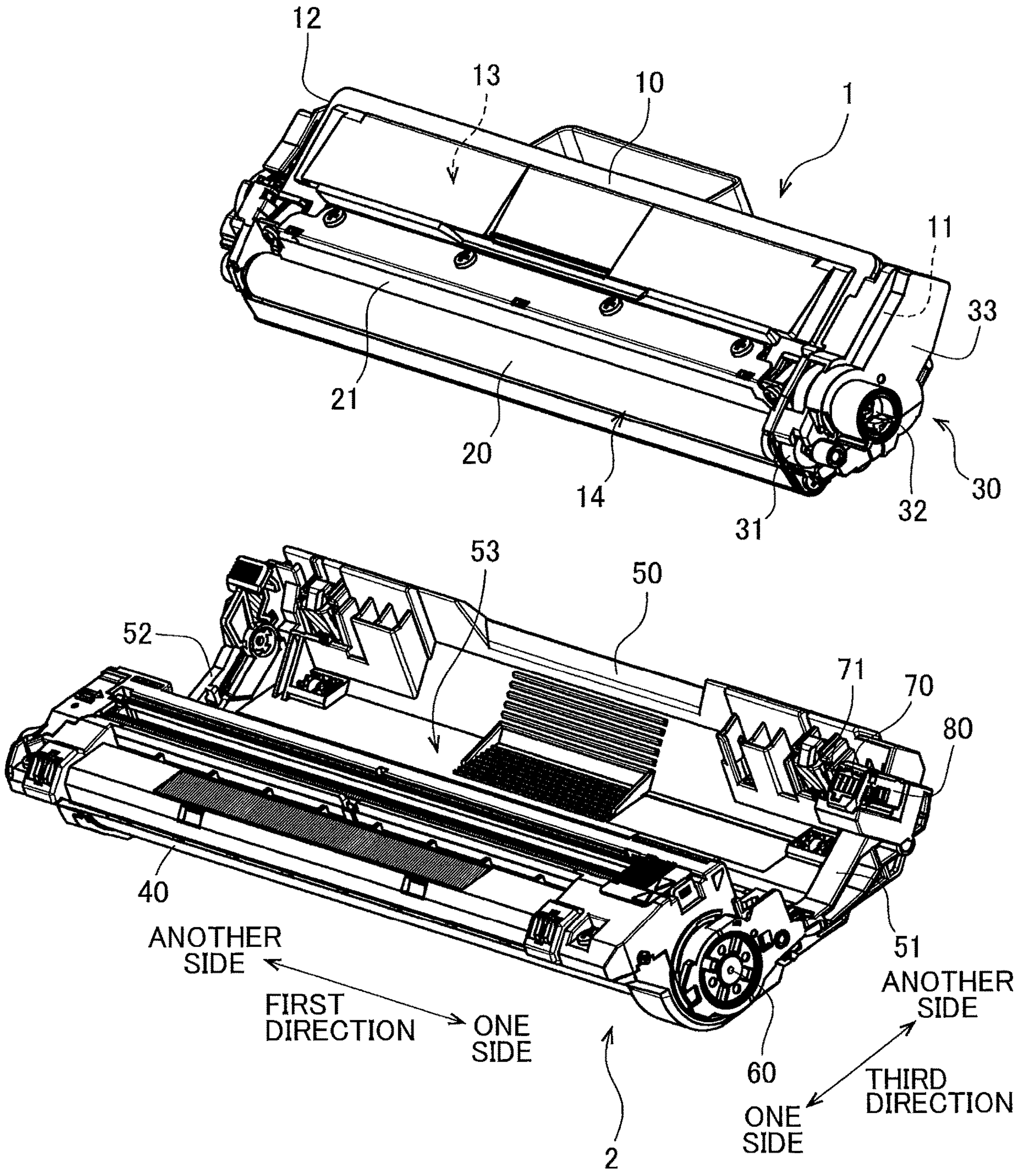
FIG. 2 is a perspective view of a developing cartridge and a drum cartridge according to one embodiment.
Figure 3:
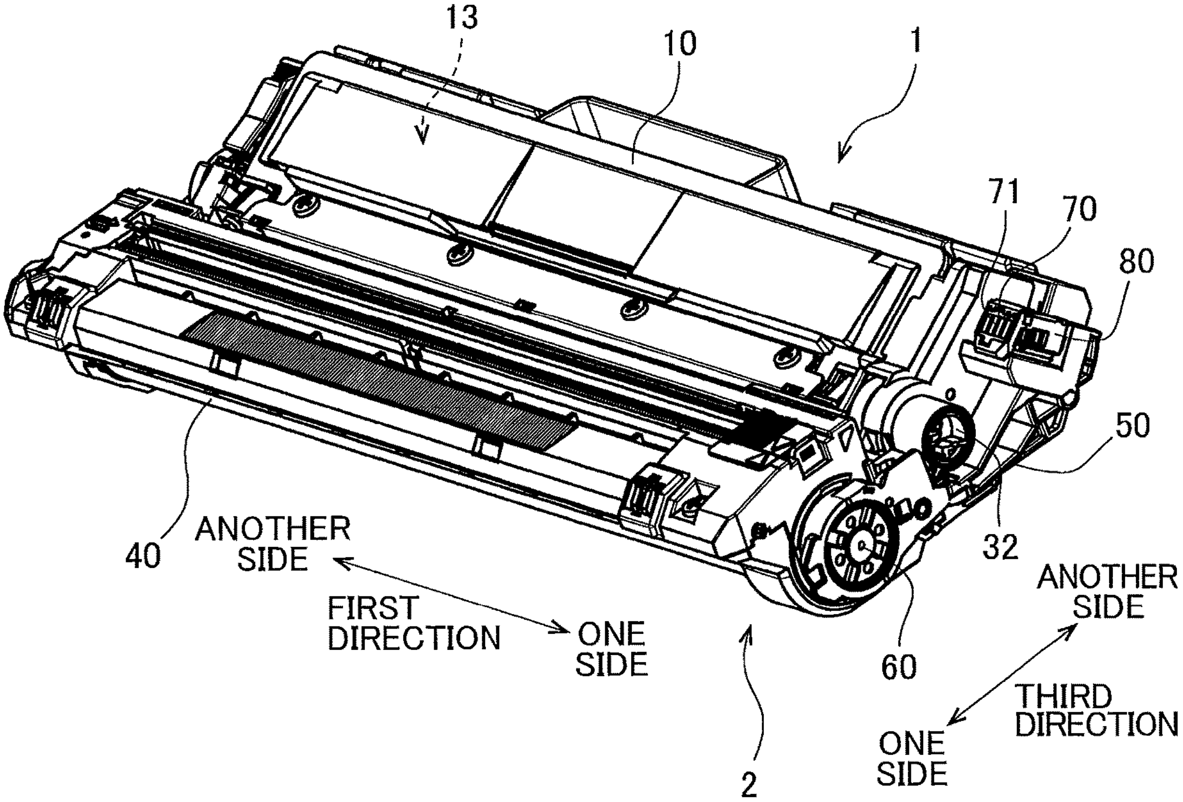
FIG. 3 is a perspective view of the drum cartridge to which the developing cartridge is attached.
Figure 4:
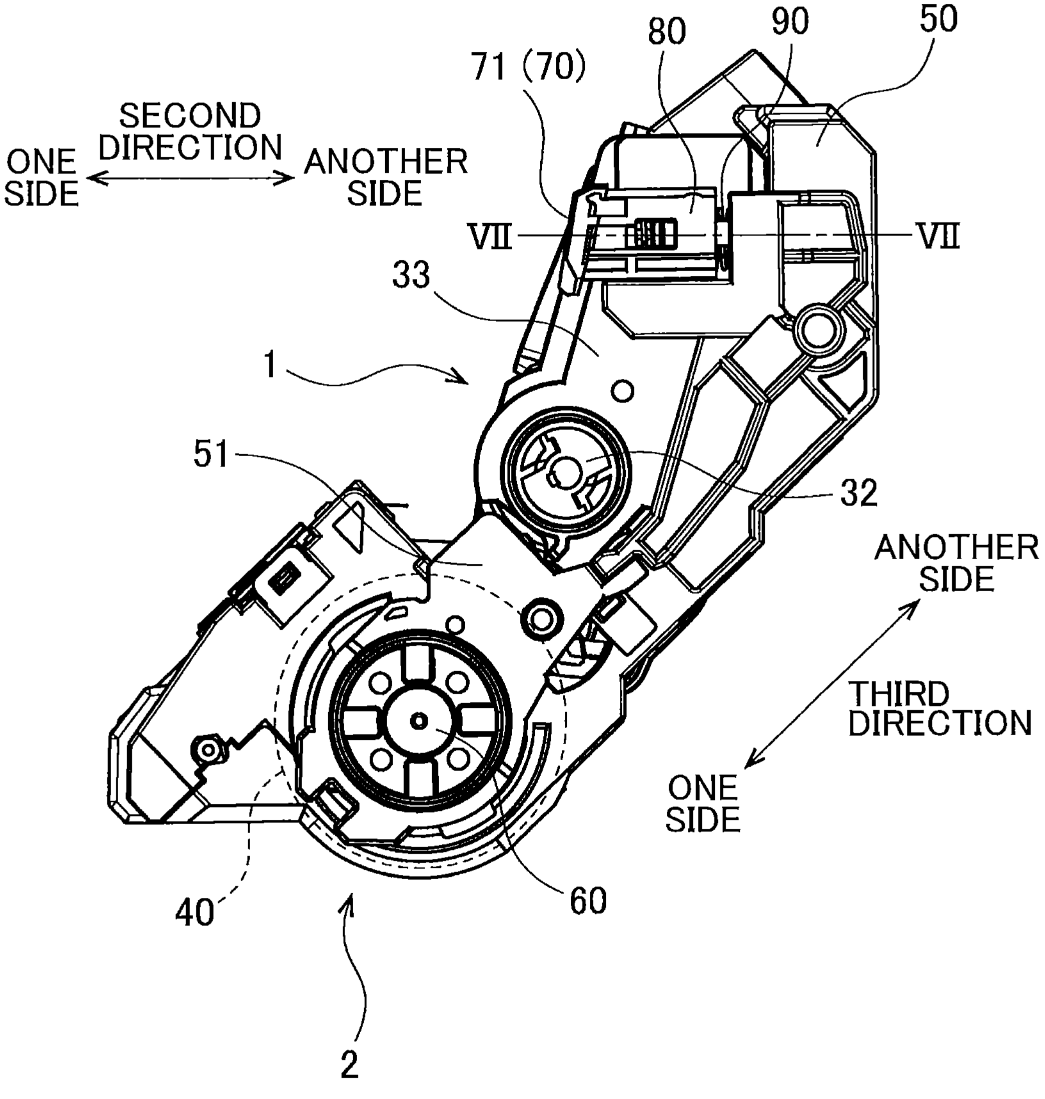
FIG. 4 is a view of the drum cartridge to which the developing cartridge is attached as viewed from one side in a first direction.

FIG. 2 is a perspective view of the developing cartridge 1 and the drum cartridge 2. FIG. 3 is a perspective view of the drum cartridge 2 to which the developing cartridge 1 is attached. FIG. 4 is a view of the drum cartridge 2 to which the developing cartridge 1 is attached as viewed from one side in the first direction. As illustrated in FIGS. 2 and 3, each developing cartridge 1 includes a casing 10, a developing roller 20, and a gear portion 30.

The casing 10 is a container for storing the developer therein. The casing 10 has a first outer surface 11 and a second outer surface 12. The first outer surface 11 and second outer surface 12 are spaced away from each other in the first direction. The casing 10 extends in the first direction to span between from the first outer surface 11 and the second outer surface 12. The gear portion 30 is positioned at the first outer surface 11. The casing 10 has an internal space in which an accommodation chamber 13 is provided. The developer is accommodated in the accommodation chamber 13. The casing 10 has an opening 14. The opening 14 is positioned at one end portion of the casing 10 in the third direction. The accommodation chamber 13 is in communication with an outside of the casing 10 through the opening 14.

The developing roller 20 is rotatable about a rotation axis extending in the first direction. The developing roller 20 is positioned at the opening 14 of the casing 10. That is, the developing roller 20 is positioned at the one end portion of the casing 10 in the third direction. The developing roller 20 includes a developing-roller body and a developing-roller shaft. The developing-roller body is a hollow cylindrical member extending in the first direction. The developing-roller body is made from an elastic material such as a rubber. The developing-roller shaft is a solid cylindrical member extending throughout the developing-roller body in the first direction. The developing-roller shaft is made from metal or electrically conductive resin.

The developing-roller body is fixed to the developing-roller shaft. Further, the developing-roller shaft has one end portion in the first direction fixed to a developing-roller gear 31 of the gear portion 30. Accordingly, in accordance with rotation of the developing-roller gear 31, the developing-roller shaft is caused to rotate, thereby causing the developing-roller body to rotate together with the developing-roller shaft.

Incidentally, the developing-roller shaft may not penetrate the developing-roller body in the first direction. For example, a developing-roller shaft may extend in the first direction from each end of the developing-roller body in the first direction.

The developing cartridge 1 further includes a supply roller (not illustrated). The supply roller is positioned between the developing roller 20 and the accommodation chamber 13. The supply roller is rotatable about a rotation axis thereof extending in the first direction. Upon application of driving force to the developing cartridge 1, the developer is supplied from the accommodation chamber 13 in the casing 10 to an outer peripheral surface of the developing roller 20 through the supply roller. At this time, the developer is subjected to triboelectric charging between the supply roller and the developing roller 20. Further, a bias voltage is applied to the developing-roller shaft of the developing roller 20. Hence, the developer is attracted to the outer peripheral surface of the developing roller 20 by electrostatic force generated between the developing-roller shaft and the developer.

The developing cartridge 1 further includes a layer thickness regulation blade 21. The layer thickness regulation blade 21 is configured to regulate a thickness of the developer supplied to the outer peripheral surface of the developing roller 20 into a uniform thickness. Thereafter, the developer on the outer peripheral surface of the developing roller 20 is supplied to a photosensitive drum 40 (described later) in the drum cartridge 2. In the meantime, the developer moves from the developing roller 20 to an electrostatic latent image formed on an outer peripheral surface of the photosensitive drum 40. Hence, the electrostatic latent image becomes a visible image on the outer peripheral surface of the photosensitive drum 40.

The gear portion 30 is positioned at the first outer surface 11 of the casing 10. The gear portion 30 includes a plurality of gears including the developing roller gear 31, a toner coupling 32, and a gear cover 33. The gear cover 33 is fixed to the first outer surface 11 of the casing 10 by means of, for example, screw fixing. At least a part of the plurality of gears is positioned between the first outer surface 11 and the gear cover 33. The toner coupling 32 is exposed to an outside through the gear cover 33. Upon attachment of the drum cartridge 2 to the main-body frame 910 of the image-forming apparatus 900 with the developing cartridge 1 attached to the drum cartridge 2, a toner drive shaft (not illustrated) of the body of the image-forming apparatus 900 is connected to the toner coupling 32. Thus, a rotation of the toner drive shaft is transmitted to the plurality of gears including the developing roller gear 31 through the toner coupling 32.

Incidentally, the plurality of gears of the gear portion 30 may transmit rotational force by meshing engagement between gear teeth, or by frictional force.

Figure 5:
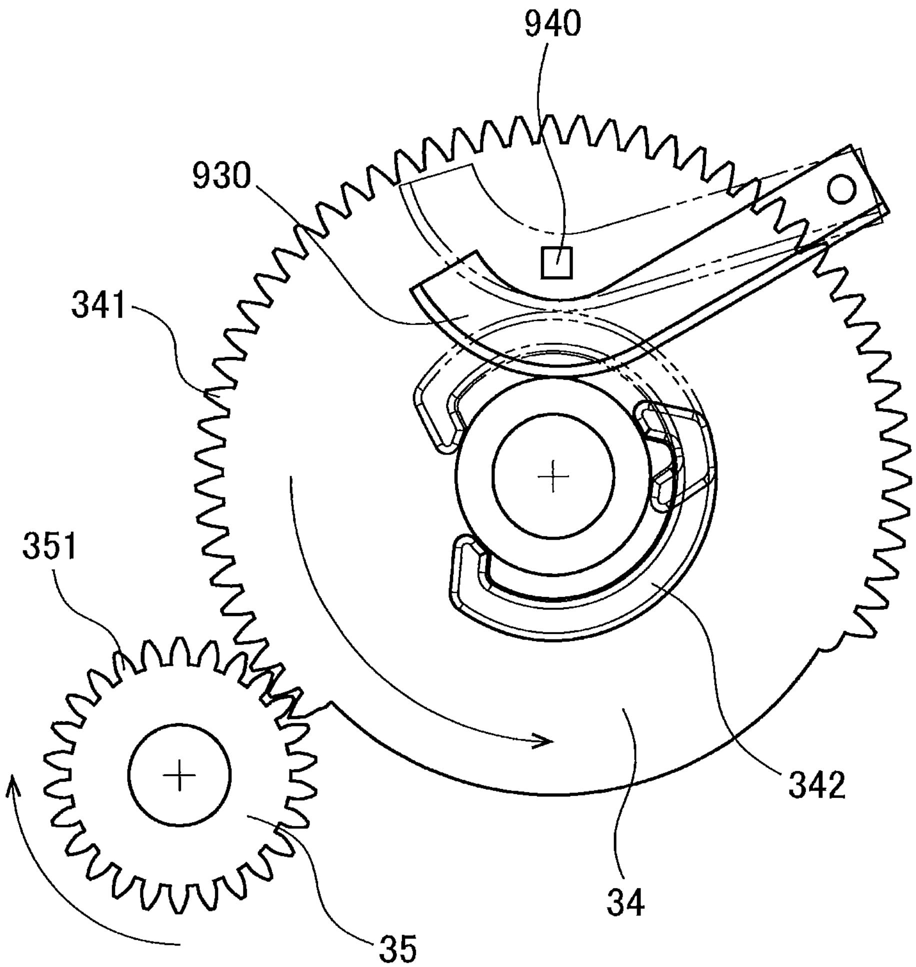
FIG. 5 is a plan view illustrating a first gear and a second gear included in a gear portion of the developing cartridge.

FIG. 5 is a plan view of a first gear 34 and a second gear 35 included in the gear portion 30. The first gear 34 is a gear for transmitting information on the developing cartridge 1 to the body of the image-forming apparatus 900. The information on the developing cartridge 1 may include information as to whether the developing cartridge 1 is new (unused) or used. The information on the developing cartridge 1 may also include a specification of the developing cartridge 1, such as an amount of developer contained in the developing cartridge 1, and yield information indicative of a number of printable sheets with the developer.

The first gear 34 is rotatable about its rotation axis extending in the first direction. The first gear 34 has a plurality of gear teeth 341 provided along a part of an outer periphery of the first gear 34. Incidentally, the first gear 34 does not have gear teeth along a remaining part of the outer periphery. The first gear 34 also includes a detecting protrusion 342. The detecting protrusion 342 protrudes from one surface in the first direction of the first gear 34 toward the one side in the first direction. Further, the detecting protrusion 342 extends in an arcuate shape whose center is coincident with the rotation axis of the first gear 34.

The second gear 35 is meshingly engageable with the first gear 34. The second gear 35 is rotatable about its rotation axis extending in the first direction. The second gear 35 includes a plurality of gear teeth 351 along an entire outer periphery of the second gear 35. The gear teeth 341 of the first gear 34 are in meshing engagement with the gear teeth 351 of the second gear 35 in a state where the developing cartridge 1 is new.

When the drum cartridge 2 to which the new developing cartridge 1 is attached is attached to the main-body frame 910, the toner coupling 32 receives a driving force from the toner drive shaft of the body of the image-forming apparatus 900. Hence, the second gear 35 is caused to rotate by the driving force transmitted from the toner coupling 32. Accordingly, the first gear 34 rotates in accordance with the rotation of the second gear 35. However, since the gear teeth 341 are provided only along the part of the outer periphery of the first gear 34, the first gear 34 is disengaged from the second gear 35 after a prescribed angular rotation of the first gear 34. Thus, the first gear 34 stops rotating.

In this way, the first gear 34 is disengaged from the second gear 35 once the developing cartridge 1 is used in the image-forming apparatus 900. Therefore, transmission of the rotation of the second gear 35 to the first gear 34 does not occur in a case where the developing cartridge 1, which is once used and detached from the main-body frame 910, is to be re-attached to the main-body frame 910. Thus, the first gear 34 is no longer rotatable.

Further, the image-forming apparatus 900 includes a lever 930 and an optical sensor 940. The lever 930 is capable of contacting with the detecting protrusion 342 of the first gear 34. The lever 930 is pivotally movable about a pivot axis extending in the first direction between a first position (shown by solid lines in FIG. 5) and a second position (shown by two dotted chain lines in FIG. 5) positioned farther away from the rotation axis of the first gear 34 than the first position is from the rotation axis.

The optical sensor 940 is configured to detect displacement of the lever 930 and transmit a detection signal to the controller 920. For example, a sensor unit including a light emitting portion and a light receiving portion is used as the optical sensor 940. When the lever 930 is at the first position, light emitted from the light emitting portion is received by the light receiving portion without being blocked by the lever 930. On the other hand, when the lever 930 is at the second position, the light emitted from the light emitting portion is blocked by the lever 930. Hence, the light from the light emitting portion cannot be received by the light receiving portion. In this way, the optical sensor 940 can determine whether the lever 930 is at the first position or the second position depending on whether the light receiving portion receives the light or not.

The controller 920 is configured to determine whether the developing cartridge 1 attached to the body of the image-forming apparatus 900 is new or used on a basis of the detection signal obtained from the optical sensor 940. Further, the controller 920 is configured to detect the specification of the developing cartridge 1 attached to the body of the image-forming apparatus 900 on a basis of a waveform of the detection signal.

3. Drum Cartridge

As illustrated in FIGS. 2 through 4, the drum cartridge 2 includes the photosensitive drum 40, a drum frame 50, a drum coupling 60, the memory 70, a holder 80, and a coil spring 90.

The photosensitive drum 40 is rotatable about its rotation axis extending in the first direction. The photosensitive drum 40 has a cylindrical outer peripheral surface extending in the first direction. The outer peripheral surface is made from a photosensitive material. Upon attachment of the developing cartridge 1 to the drum cartridge 2, the outer peripheral surface of the developing roller 20 contacts the outer peripheral surface of the photosensitive drum 40.

The drum frame 50 includes a first side frame 51 and a second side frame 52. The second side frame 52 is positioned further toward the another side in the first direction than the first side frame 51. The photosensitive drum 40 is positioned at one end portion in the third direction of the drum frame 50. Specifically, the photosensitive drum 40 is positioned between one end portion of the first side frame 51 in the third direction and one end portion of the second side frame 52 in the third direction. The photosensitive drum 40 is rotatably supported by the first side frame 51 and the second side frame 52.

Further, the drum frame 50 is configured to receive the developing cartridge 1. Specifically, the drum frame 50 has a recessed portion 53 in which the developing cartridge 1 is configured to be received. The recessed portion 53 is positioned between the first side frame 51 and the second side frame 52, and further toward the another side in the third direction than the photosensitive drum 40.

The drum coupling 60 is rotatable together with the photosensitive drum 40. The drum coupling 60 is positioned at an outer surface of one end portion in the first direction of the drum frame 50. Specifically, one end portion of the first side frame 51 in the third direction has a circular hole. The drum coupling 60 is positioned in the circular hole. Upon attachment of the drum cartridge 2 to the main-body frame 910 of the image-forming apparatus 900, a drum drive shaft of the image-forming apparatus 900 is connected to the drum coupling 60. Rotations of the drum drive shaft are thus transmitted to the photosensitive drum 40 through the drum coupling 60.

The memory 70 is a storage medium capable of storing various information on the drum cartridge 2. The information stored in the memory 70 includes, for example, at least one of: a serial number of the drum cartridge 2; a cumulative number of rotations of the photosensitive drum 40; a cumulative number of printed sheets using the photosensitive drum 40; matching model(s) to which the drum cartridge 2 is installable; a specification of the drum cartridge 2; information indicative of whether the drum cartridge 2 is new; and an error history as to the drum cartridge 2. Further, the memory 70 also stores therein a replacement number of the developing cartridge 1 with respect to the drum frame 50.

In a case where the cumulative number of rotations or the cumulative number of printed sheets is stored in the memory 70, the controller 920 of the image-forming apparatus 900 updates the cumulative rotation number or the cumulative number of printed sheets stored in the memory 70 each time a printing process is performed. This updating may be performed by increment starting from zero or decrement from a predetermined value.

An IC chip may be used as the memory 70, for example. The memory 70 has an electrical contact surface 71 having electrical conductivity.

Figure 6:
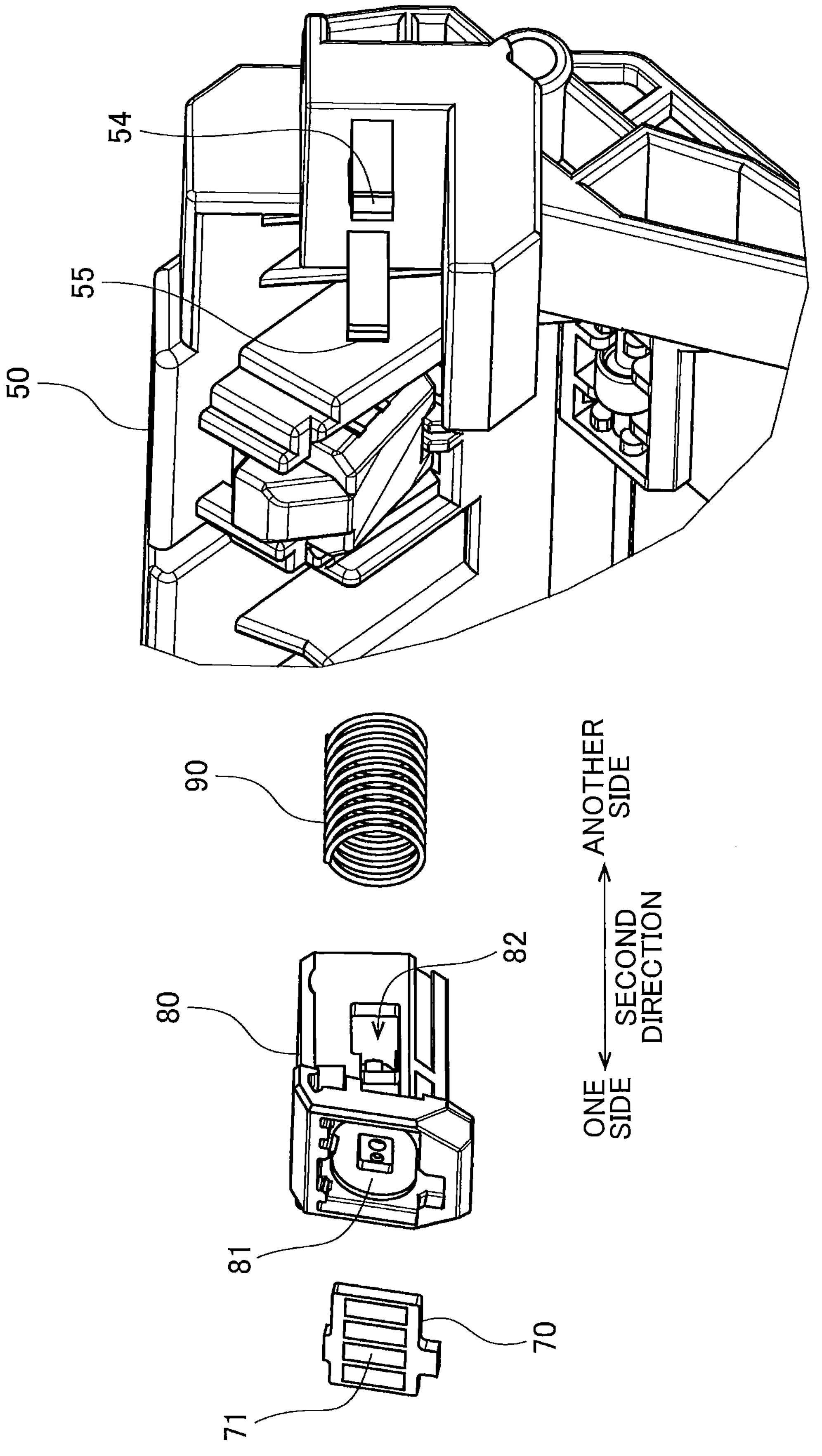
FIG. 6 is an exploded perspective view illustrating a memory, a holder, a coil spring, and a drum frame in the drum cartridge according to the embodiment.
Figure 7:
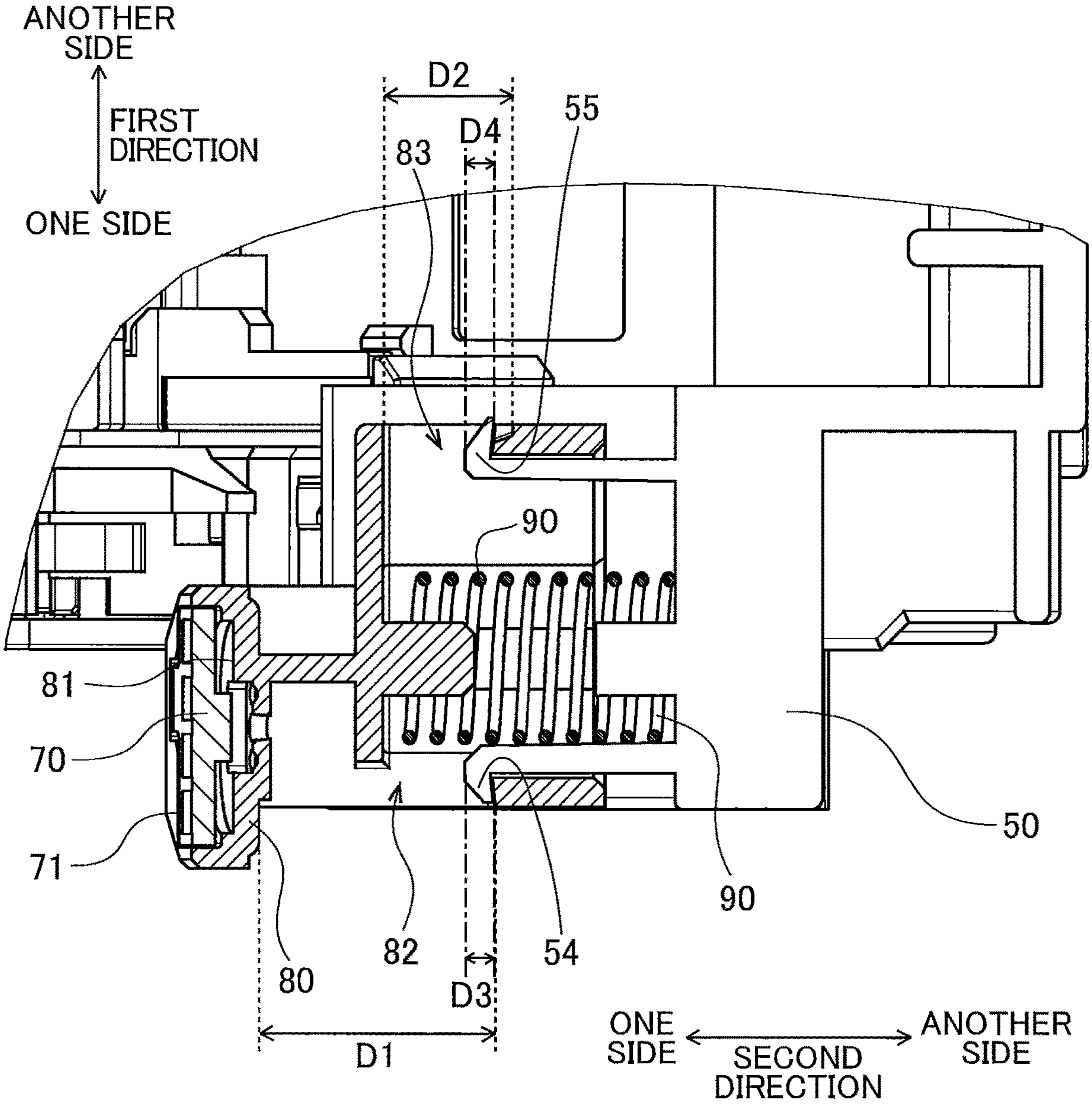
FIG. 7 is a cross-sectional view of the memory, the holder, the coil spring, and the drum frame taken along a line VII-VII in FIG. 4.

The holder 80 is configured to hold the memory 70. The holder 80 is positioned at another end portion of the first side frame 51 in the third direction. FIG. 6 is an exploded perspective view of the memory 70, holder 80, coil spring 90, and drum frame 50. FIG. 7 is a cross-sectional view of the memory 70, holder 80, coil spring 90, and drum frame 50 taken along a line VII-VII shown in FIG. 4. As illustrated in FIGS. 6 and 7, the holder 80 has one end in the second direction having a retaining surface 81. The memory 70 is held by the retaining surface 81. For example, the memory 70 is fixed to the retaining surface 81 by an adhesive agent. Hence, the electrical contact surface 71 of the memory 70 is positioned at one end portion in the second direction of the holder 80. The electrical contact surface 71 is positioned at an outer surface of the drum frame 50 without being covered by the developing cartridge 1 in a state where the developing cartridge 1 is attached to the drum frame 50.

The coil spring 90 is a resilient member configured to expand and compress in the second direction. The coil spring 90 is positioned between the retaining surface 81 and the drum frame 50 in the second direction. In other words, the coil spring 90 is positioned between the electrical contact surface 71 of the memory 70 and the drum frame 50 in the second direction. The coil spring 90 has one end portion in the second direction connected to the holder 80, and another end portion in the second direction connected to the drum frame 50.

The coil spring 90 is expandable and shrinkable in the second direction between a first state and a second state. The coil spring 90 has a shorter length in the second state than in the first state. A distance between the drum frame 50 and the electrical contact surface 71 in the second direction in the second state of the coil spring 90 is shorter than a distance between the drum frame 50 and the electrical contact surface 71 in the second direction in the first state of the coil spring 90. That is, the holder 80 is movable in the second direction relative to the drum frame 50. In response to the movement of the holder 80 in the second direction relative to the drum frame 50, the electrical contact surface 71 of the memory 70 moves along with the holder 80 in the second direction relative to the drum frame 50.

As illustrated in FIGS. 6 and 7, the holder 80 has a first hole 82 and a second hole 83. The first hole 82 is positioned at one end portion in the first direction of the holder 80. The second hole 83 is positioned at another end portion in the first direction of the holder 80. The first hole 82 and the second hole 83 may be through-holes or grooves.

The drum frame 50 has a first pawl 54 and a second pawl 55. The first pawl 54 is a tip end portion protruding toward the one side in the first direction from an extending portion that extends toward the one side in the second direction from the drum frame 50. The second pawl 55 is a tip end portion protruding toward the another side in the first direction from an extending portion that extends toward the one side in the second direction from the drum frame 50. The first pawl 54 is fitted with the first hole 82. Hence, the first pawl 54 is engaged with the first hole 82. The second pawl 55 is fitted with the second hole 83. Hence, the second pawl 55 is engaged with the second hole 83. The first hole 82 has a size D1 in the second direction greater than a size D3 in the second direction of the first pawl 54. The second hole 83 has a size D2 in the second direction greater than a size D4 in the second direction of the second pawl 55.

While the coil spring 90 is in the first state, the first pawl 54 is in contact with an edge of the first hole 82 of the holder 80 at the another side in the second direction, and the second pawl 55 is in contact with an edge of the second hole 83 of the holder 80 at the another side in the second direction. With this structure, the holder 80 is restricted from moving further toward the one side in the second direction. Accordingly, the holder 80 is prevented from coming off the drum frame 50.

While the coil spring 90 is in the second state, the first pawl 54 is separated from the edge of the first hole 82 of the holder 80 at the another side in the second direction, and the second pawl 55 is separated from the edge of the second hole 83 of the holder 80 at the another side in the second direction.

Incidentally, the holder 80 may have the first pawl and the second pawl, and the drum frame 50 may have the first hole fitted with the first pawl and the second hole fitted with the second pawl. That is, one of the drum frame 50 and the holder 80 may have the pawls, and remaining one of the drum frame 50 and the holder 80 may have the holes fitted with the pawls.

As illustrated in FIG. 1, the image-forming apparatus 900 further includes four electrical contacts 950 having electrical conductivity. Each of the electrical contacts 950 is electrically connected to the controller 920. The electrical contact surface 71 of the memory 70 is brought into contact with the corresponding one of the electrical contacts 950 upon attachment of the drum cartridge 2 (to which the developing cartridge 1 is attached) to the main-body frame 910. Therefore, the controller 920 is electrically connected to the memory 70 through the electrical contact 950 and the electrical contact surface 71. Accordingly, the controller 920 can perform at least one of: reading information from the memory 70; and writing information in the memory 70.

The coil spring 90 shrinks from the first state to the second state when the electrical contact surface 71 of the memory 70 is brought into contact with the corresponding electrical contact 950. Hence, the electrical contact surface 71 moves toward the another side in the second direction relative to the drum frame 50. That is, the distance between the drum frame 50 and the electrical contact surface 71 in the second direction becomes shortened. Accordingly, a pressure applying between the electrical contact surface 71 and the electrical contact 950 can be reduced, and as a result, rubbing of the electrical contact surface 71 can be restrained.

After the drum cartridge 2 to which the developing cartridge 1 is attached is attached to the main-body frame 910, the image-forming apparatus 900 may occasionally perform a separating operation where the developing roller 20 is temporarily separated from the photosensitive drum 40. During the separating operation, the casing 10 of the developing cartridge 1 moves toward the another side in the third direction relative to the drum frame 50 of the drum cartridge 2. However, the position of the drum frame 50 relative to the main-body frame 910 is kept unchanged during the separating operation. Therefore, the positions of the electrical contact 950 and the electrical contact surface 71 are also maintained unchanged. Hence, rubbing between the electrical contact 950 and the electrical contact surface 71 during the separating operation does not occur in spite of the fact that the holder 80 is immovable in the third direction relative to the drum frame 50.

Further, according to the present embodiment, the number of times of replacement of the developing cartridge 1 with respect to the drum cartridge 2 is stored in the memory 70 of the drum cartridge 2. Hence, the controller 920 can read the number of times of the replacement from the memory 70 of the drum cartridge 2, although the developing cartridge 1 does not include a memory. Thus, the controller 920 can monitor the number of times of replacement of the developing cartridge 1.

Further, the memory 70 of the drum cartridge 2 may be configured to store at least one of the following information: an amount of the developer accommodated in the developing cartridge 1; a number of counted dots printable with the developer; and a number of printable sheets with the developer. Further, the memory 70 of the drum cartridge 2 may be configured to store at least one of the following information: a cumulative number of rotations of the developing roller 20; a cumulative number of printed sheets with the developing roller 20; and a cumulative number of counted dots with the developing roller 20. In the latter case, the controller 920 of the image-forming apparatus 900 updates the cumulative number of rotations, cumulative number of printed sheets, or cumulative number of counted dots stored in the memory 70 each time a printing operation is performed. This updating may be performed by increment starting from zero or decrement from a predetermined value. With such a configuration, the controller 920 can determine a service life of the developing cartridge 1 on a basis of the information stored in the memory 70 of the drum cartridge 2 even if the developing cartridge 1 does not includes the memory. Hence, the controller 920 can notify a time suitable for replacement of the developing cartridge 1.

4. Modifications

While the description has been made in detail with reference to the embodiment, the present disclosure should not be limited to the depicted embodiment.

For example, in the above-described embodiment, the memory 70 having the electrical contact surface 71 is fixed to the outer surface of the holder 80. However, only the electrical contact surface 71 may be positioned on the outer surface of the holder 80, and a remaining portion of the memory 70 other than the electrical contact surface 71 may be arranged at a position in the drum cartridge 2 other than the outer surface of the holder 80.

In the above-described embodiment, the coil spring 90 is employed as a resilient member. However, other kinds of resilient or elastic member such as a leaf spring, a torsion spring, and a rubber may be used instead of the coil spring 90.

Further, in the above-described embodiment, the developing cartridge 1 includes the developing roller 20. However, the developing cartridge 1 may not include the developing roller 20, but the drum cartridge 2 may include the developing roller 20.

Further, detailed configurations of the developing cartridge 1, the drum cartridge 2 and the image-forming apparatus 900 may be different from those illustrated in the respective drawings. Parts and components appearing in the embodiment and the modifications may be suitably combined in any way that does not produce inconsistencies.

REMARKS

The drum cartridge 2 is an example of a drum cartridge. The drum frame 50 is an example of a drum frame. The photosensitive drum 40 is an example of a photosensitive drum. The memory 70 is an example of a memory. The electrical contact surface 71 is an example of an electrical contact surface. The coil spring 90 is an example of a resilient member. The first gear 34 is an example of a first gear. The gear teeth 341 are an example of a first engagement portion. The second gear 35 is an example of a second gear. The gear teeth 351 are an example of a second engagement portion. The first pawl 54 and second pawl 55 are examples of a pawl. The first hole 82 and second hole 83 are examples of a hole.

What is claimed is:

1. A drum cartridge for use with a developing cartridge including a developing roller, the drum cartridge comprising:

a drum frame having a recessed portion in which the developing cartridge is configured to be received;

a photosensitive drum rotatable about an axis extending in a first direction; and a memory having an electrical contact surface, wherein the electrical contact surface is movable relative to the photosensitive drum.

2. The drum cartridge according to claim 1, further comprising:

a resilient member being able to deform elastically, wherein the electrical contact surface is movable relative to the drum frame when the resilient member deforms elastically.

3. The drum cartridge according to claim 2, wherein the resilient member is positioned between the electrical contact surface and the drum frame.

4. The drum cartridge according to claim 3, wherein the resilient member is a spring.

5. The drum cartridge according to claim 4, wherein the resilient member is a coil spring.

6. The drum cartridge according to claim 2, wherein the memory is movable relative to the photosensitive drum when the resilient member deforms elastically.

7. The drum cartridge according to claim 1, further comprising:

a holder holding the electrical contact surface, the holder being movable relative to the drum frame.

8. The drum cartridge according to claim 7, further comprising:

a resilient member being able to deform elastically, wherein the electrical contact surface is movable relative to the drum frame when the resilient member deforms elastically.

9. The drum cartridge according to claim 8, wherein the resilient member contacts the holder.

10. The drum cartridge according to claim 7, wherein the holder has a retaining surface, and wherein the memory is fixed to the retaining surface.

11. The drum cartridge according to claim 10, wherein the memory is fixed to the retaining surface by an adhesive agent.

12. The drum cartridge according to claim 7, wherein the holder includes a first holder and a second holder, wherein the first holder has a first pawl protruding in the first direction, wherein the second holder has a first hole with which the first pawl is fitted, and wherein the first hole has a size in a second direction greater than a size in the second direction of the first pawl, the second direction crossing the electrical contact surface.

13. The drum cartridge according to claim 12, wherein the first holder has a second pawl protruding in the first direction, the second pawl being spaced apart from the first pawl in the first direction, and wherein the second holder has a second hole with which the second pawl is fitted, the second hole being spaced apart from the first hole in the first direction.

14. The drum cartridge according to claim 13, wherein the first holder further has:

a first surface facing the second holder, a first extending portion extending from the first surface toward the second holder in the second direction, and a second extending portion extending from the first surface toward the second holder in the second direction, wherein the first pawl is a tip end portion protruding from the first extending portion toward one side in the first direction, and wherein the second pawl is a tip end portion protruding from the second extending portion toward another side in the first direction.

15. The drum cartridge according to claim 14, further comprising:

a resilient member positioned between the first holder and the second holder.

16. The drum cartridge according to claim 12, wherein the drum frame rotatably supports the photosensitive drum, and wherein the first holder is a part of the drum frame.

17. The drum cartridge according to claim 1, wherein the drum frame has a first end and a second end spaced apart from the first end in the first direction, wherein the photosensitive drum has a third end positioned at the first end of the drum frame and a fourth end positioned at the second end of the drum frame, and wherein a first distance between the electrical contact surface and the fourth end in the first direction is larger than a second distance between the third end and the fourth end in the first direction.

18. The drum cartridge according to claim 1, further comprising:

a drum coupling rotatable with the photosensitive drum, wherein the drum frame has a first end and a second end spaced apart from the first end in the first direction, wherein the electrical contact surface is positioned at the first end, and wherein the drum coupling is positioned at the first end.

19. The drum cartridge according to claim 1, wherein the electrical contact surface is positioned closer to the developing roller than the electrical contact surface is to the photosensitive drum in a direction crossing the first direction and a second direction in a state where the developing cartridge is attached to the drum frame, the second direction crossing the electrical contact surface.

20. The drum cartridge according to claim 19, wherein the drum frame has a first end and a second end spaced apart from the first end in the first direction, wherein the electrical contact surface is positioned at the first end, and wherein a toner coupling of the developing cartridge is positioned at the first end in the state where the developing cartridge is attached to the drum frame.

* * * * *